US012608349B2

(12) United States Patent
Walker et al.

(10) Patent No.: US 12,608,349 B2
(45) Date of Patent: Apr. 21, 2026

(54) SELF-VERSIONING DATA LAKE

(71) Applicant: IGT, Las Vegas, NV (US)

(72) Inventors: Robert Walker, Wakefield, RI (US);
Bradley Boudreau, Moncton (CA);
Yves Légère, Moncton (CA)

(73) Assignee: IGT, Las Vegas, NV (US)

( * ) Notice: Subject to any disclaimer, the term of this
patent is extended or adjusted under 35
U.S.C. 154(b) by 0 days.

(21) Appl. No.: 19/083,139

(22) Filed: Mar. 18, 2025

(65) Prior Publication Data

US 2025/0217329 A1    Jul. 3, 2025

Related U.S. Application Data

(63) Continuation of application No. 18/210,197, filed on
Jun. 15, 2023, now Pat. No. 12,277,096.

(51) Int. Cl.
| | |
|---|---|
| *G06F 16/21* | (2019.01) |
| *G06F 16/23* | (2019.01) |
| *G06F 16/25* | (2019.01) |

(52) U.S. Cl.
CPC ........ *G06F 16/213* (2019.01); *G06F 16/2365*
(2019.01); *G06F 16/25* (2019.01)

(58) Field of Classification Search
CPC .... G06F 16/213; G06F 16/2365; G06F 16/25;
G06F 16/219
See application file for complete search history.

(56) References Cited

U.S. PATENT DOCUMENTS

| | | | |
|---|---|---|---|
| 8,147,334 | B2 | 4/2012 | Gatto et al. |
| 8,764,566 | B2 | 7/2014 | Miltenberger et al. |
| 9,229,952 | B1 * | 1/2016 | Meacham ........... G06F 16/1873 |
| 11,599,514 | B1 | 3/2023 | Agrawal et al. |
| 12,277,096 | B2 | 4/2025 | Walker et al. |
| 2018/0096001 | A1 * | 4/2018 | Soza ..................... G06F 16/235 |
| 2022/0237172 | A1 * | 7/2022 | Zhang ................. G06F 21/6227 |
| 2023/0385265 | A1 | 11/2023 | Karamanolis |
| 2025/0335456 | A1 * | 10/2025 | Farr ..................... G06F 16/258 |

OTHER PUBLICATIONS

Nargesian et al., Data Lake Management: Challenges and Opportunities, Proceedings of the VLDB Endowment, vol. 12, No. 12, retrieved on Nov. 28, 2025, retrieved from the Internet <URL:https://dl.acm.org/doi/pdf/10.14778/3352063.3352116> (Year: 2019).*
Notice of Allowance for U.S. Appl. No. 18/210,197, dated Dec. 18, 2024 11 pages.

* cited by examiner

*Primary Examiner* — Tyler J Torgrimson
(74) *Attorney, Agent, or Firm* — Sheridan Ross P.C.

(57) ABSTRACT

Embodiments of the present disclosure are directed to maintaining a self-versioning data lake. According to one embodiment, a method for providing access to a data lake can comprise maintaining a corpus of data in an initial version the data lake, monitoring versioning information for each of a plurality of schemas for data submitted to the data lake, and detecting a change in a schema of the plurality of schemas based on the monitoring of the versioning information for the plurality of schema. A new version of the data lake can be created based on the detected changes in the schema while maintaining the initial version of the data lake. A notification of availability of the new version of the data lake can be provided to users of the data lake.

20 Claims, 8 Drawing Sheets

405

Retrieve schema(s)

410

Create tables

415

Populate new version of data lake

505

Read schema

510

Remove read
schema from table

515

Update definition
for schema

705

Retrieve data

710

Validate retrieved data

715

Save validated data in new version of data lake

SELF-VERSIONING DATA LAKE

CROSS REFERENCE TO RELATED APPLICATION

The present application is a continuation of and claims the benefit of and priority to U.S. application Ser. No. 18/210,197, filed Jun. 15, 2023, the entire disclosure of which is incorporated herein by reference.

BACKGROUND

The present disclosure is generally directed to maintaining and providing access to a corpus of information in a data lake and, in particular, toward maintaining and providing a self-versioning data lake which detects and adapts to changes in schema for information represented in corpus of information.

A data lake is a system or repository of data stored in its raw format, usually object blobs or files. A data lake is usually a single store of data including raw copies of source system data, sensor data, social data etc., and transformed data used for tasks such as reporting, visualization, advanced analytics and machine learning. Data in a data lake can be submitted by or obtained from a wide variety of sources. In some cases, structured data is provided by or obtained from the sources according to a pre-defined schema. However, problems can arise when the schema for such data changes. Specifically, this can affect processes of clients using the data of the data lake such as analytics or reporting processes generated using the previous version of the schema. In some cases, changes to the schema can unexpectedly cause such processes to produce errors or even stop working. Hence, there is a need in the art for methods and systems for addressing changes in schema represented in a corpus of information stored in a data lake in a manner that prevents problems for processes relying one or utilizing the data in the data lake.

BRIEF SUMMARY

Embodiments of the present disclosure are directed to maintaining a self-versioning data lake. According to one embodiment, a method for providing access to a data lake can comprise maintaining a corpus of data in an initial version the data lake, monitoring versioning information for each of a plurality of schemas for data submitted to the data lake, and detecting a change in a schema of the plurality of schemas based on the monitoring of the versioning information for the plurality of schema. A new version of the data lake can be created based on the detected changes in the schema while maintaining the initial version of the data lake. A notification of availability of the new version of the data lake can be provided to users of the data lake. Providing a notification of availability of the new version of the data lake to users of the data lake can comprise providing an indication of the detected change in the schema and a period of time for which the initial version of the data lake will remain available. The initial version of the data lake can be expired after the period of time has passed.

Creating the new version of the data lake can comprise retrieving the schema for which the change was detected. Retrieving the schema for which the change was detected can comprise reading the retrieved schema, removing from the read schema tables and columns defined to be excluded, and updating a definition for the schema based on the removed tables and columns.

Creating the new version of the data lake can further comprise creating a set of tables representing a new version of the retrieved schema. Creating the set of tables representing the new version of the retrieved schema can comprise building a set of statement defining the set of tables representing the new version of the retrieved schema and creating the set of tables representing the new version of the schema based on the set of statements.

Creating the new version of the data lake can further comprise populating the new version of the data lake with data based on the created set of tables. Populating the new version of the data lake with data based on the created set of tables can comprise retrieving data to be saved in the new version of the data lake based on the set of tables, validating the retrieved data, and saving the validated data in the new version of the data lake.

According to another embodiment, a system can comprise a processor and a memory coupled with and readable by the processor. The memory can store therein a set of instructions which, when executed by the processor, causes the processor to maintain a corpus of data in an initial version a data lake, monitor versioning information for each of a plurality of schemas for data submitted to the data lake, detect a change in a schema of the plurality of schemas based on the monitoring of the versioning information for the plurality of schema, and create a new version of the data lake based on the detected changes in the schema while maintaining the initial version of the data lake.

Creating the new version of the data lake can comprise retrieving the schema for which the change was detected. Retrieving the schema for which the change was detected can comprise reading the retrieved schema, removing from the read schema tables and columns defined to be excluded, and updating a definition for the schema based on the removed tables and columns.

Creating the new version of the data lake can further comprise creating a set of tables representing a new version of the retrieved schema. Creating the set of tables representing the new version of the retrieved schema can comprise building a set of statement defining the set of tables representing the new version of the retrieved schema and creating the set of tables representing the new version of the schema based on the set of statements.

Creating the new version of the data lake can further comprise populating the new version of the data lake with data based on the created set of tables. Populating the new version of the data lake with data based on the created set of tables can comprise retrieving data to be saved in the new version of the data lake based on the set of tables, validating the retrieved data, and saving the validated data in the new version of the data lake.

The instructions can further cause the processor to provide a notification of availability of the new version of the data lake to users of the data lake. Providing a notification of availability of the new version of the data lake to users of the data lake comprises providing an indication of the detected change in the schema and a period of time for which the initial version of the data lake will remain available. The instructions can further cause the processor to expire the initial version of the data lake after the period of time has passed.

According to yet another embodiment, a non-transitory, computer-readable medium can comprise a set of instructions stored therein which, when executed by a processor, causes the processor to maintain a corpus of data in an initial version a data lake, monitor versioning information for each of a plurality of schemas for data submitted to the data lake, detect a change in a schema of the plurality of schemas based on the monitoring of the versioning information for the plurality of schema, and create a new version of the data lake based on the detected changes in the schema while maintaining the initial version of the data lake.

Creating the new version of the data lake can comprise retrieving the schema for which the change was detected. Retrieving the schema for which the change was detected can comprise reading the retrieved schema, removing from the read schema tables and columns defined to be excluded, and updating a definition for the schema based on the removed tables and columns.

Creating the new version of the data lake can further comprise creating a set of tables representing a new version of the retrieved schema. Creating the set of tables representing the new version of the retrieved schema can comprise building a set of statement defining the set of tables representing the new version of the retrieved schema and creating the set of tables representing the new version of the schema based on the set of statements.

Creating the new version of the data lake can further comprise populating the new version of the data lake with data based on the created set of tables. Populating the new version of the data lake with data based on the created set of tables can comprise retrieving data to be saved in the new version of the data lake based on the set of tables, validating the retrieved data, and saving the validated data in the new version of the data lake.

The instructions can further cause the processor to provide a notification of availability of the new version of the data lake to users of the data lake. Providing a notification of availability of the new version of the data lake to users of the data lake comprises providing an indication of the detected change in the schema and a period of time for which the initial version of the data lake will remain available. The instructions can further cause the processor to expire the initial version of the data lake after the period of time has passed.

Additional features and advantages are described herein and will be apparent from the following Description and the figures.

DETAILED DESCRIPTION

Embodiments of the present disclosure are directed to maintaining and providing a self-versioning data lake which detects and adapts to changes in schema for information represented in corpus of information stored in the data lake. Users of a data lake are able to access the data stored therein and create custom data warehouses and/or data verticals upon which a number of processes such as analytics, reporting, etc. can be run. In order to prevent disrupting such processes when schema for data in the data warehouse changes, embodiments of the present disclosure provide a data lake that identifies such changes and self-versions, i.e., creates a new version integrating the changes schemas while allowing the users to transition to the change. In this way, the client customizations can be maintained while providing the clients a grace periods to migrate to the new schemas. This allows the operator of the data lake to implement changes more quickly without a need to worry about downstream implications.

Figure 1:
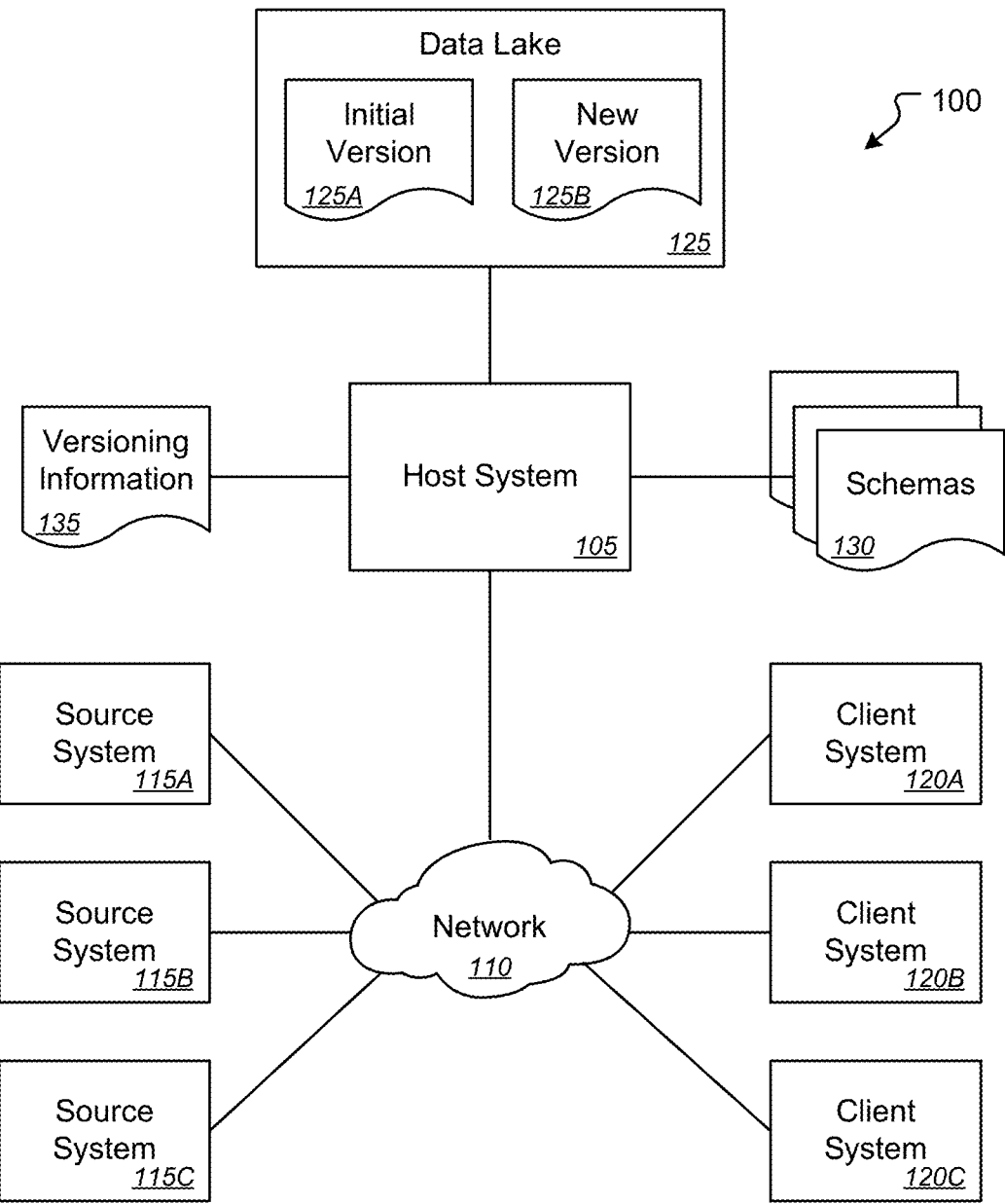
FIG. 1 is a block diagram illustrating an exemplary environment for providing a self-versioning data lake according to one embodiment of the present disclosure.

FIG. 1 is a block diagram illustrating an exemplary environment for providing a self-versioning data lake according to one embodiment of the present disclosure. As illustrated in this example, the environment 100 can comprise a host system 105 communicatively coupled with a communications network 110. The host system 105 can comprise any one or more servers and/or other computing devices as known in the art. The communications network 110 can comprise any one or more wired and/or wireless, local-area and/or wide-area networks as known in the art including, but not limited to, the Internet.

Also coupled with the communications network 110 can be any number of sources systems 115A-115C and any number of client systems 120A-120C. The source systems 115A-115C and client systems 120A-120B can each comprise any one or more servers and/or other computing devices as known in the art. Generally speaking, the source systems 115A can provide information to the host system 105 to be stored in a data lake 125 maintained by the host system 105. The information in the data lake can then be made available to the client systems 120A-120C. For example, the information provided by or obtained from the source systems 115A-115C can comprise any structured or unstructured data which can be used by the client systems 120A-120C to build customized data and applications such as analytics, modeling, report generation, etc. In the case of structured data, the information provided by or obtained from the source systems 115A-115C can conform to one or more predefined schemas 130. In such cases, any customizations used by the client systems 120A-120C will depend upon these schemas. Therefore, changes in the schemas 130 can affect processes of clients using the data of the data lake 125. In some cases, changes to the schemas can unexpectedly cause such processes to produce errors or even stop working.

According to one embodiment, the host system 105 can implement self-versioning of the data lake to prevent customizations used by the client systems 120A-120C from being corrupted in the event of a schema change for data stored in the data lake 125. Generally speaking, and as will be described further below, the host system 105 can detect changes in the schemas 130 based on a set of versioning information 135 for the schemas 130. When a change is detected in any one or more schema 130, the host system can create a new version 125B of the data lake from an initial version 125A, or previous version, of the data lake 125. The new version 125B can be generated with and using the changed schema. Meanwhile, the initial version 125A of the data lake 125 can be maintained. Once the new version 125B of the data lake 125 is generated, the host system 105 can notify the client systems 120A-120C of the availability of the new version 125B of the data lake 125. This notification can indicate the availability of the new version 125B of the data lake, possibly also identifying the changes made, and indicate a time period during which the initial version 125A of the data lake 125 will remain available. During this time period, the client systems 120A-120C can implement changes to migrate to the new version 125B of the data lake 125. Once the indicated time period has lapsed, the host system 105 can retire the initial version 125A of the data lake 125.

Figure 2:
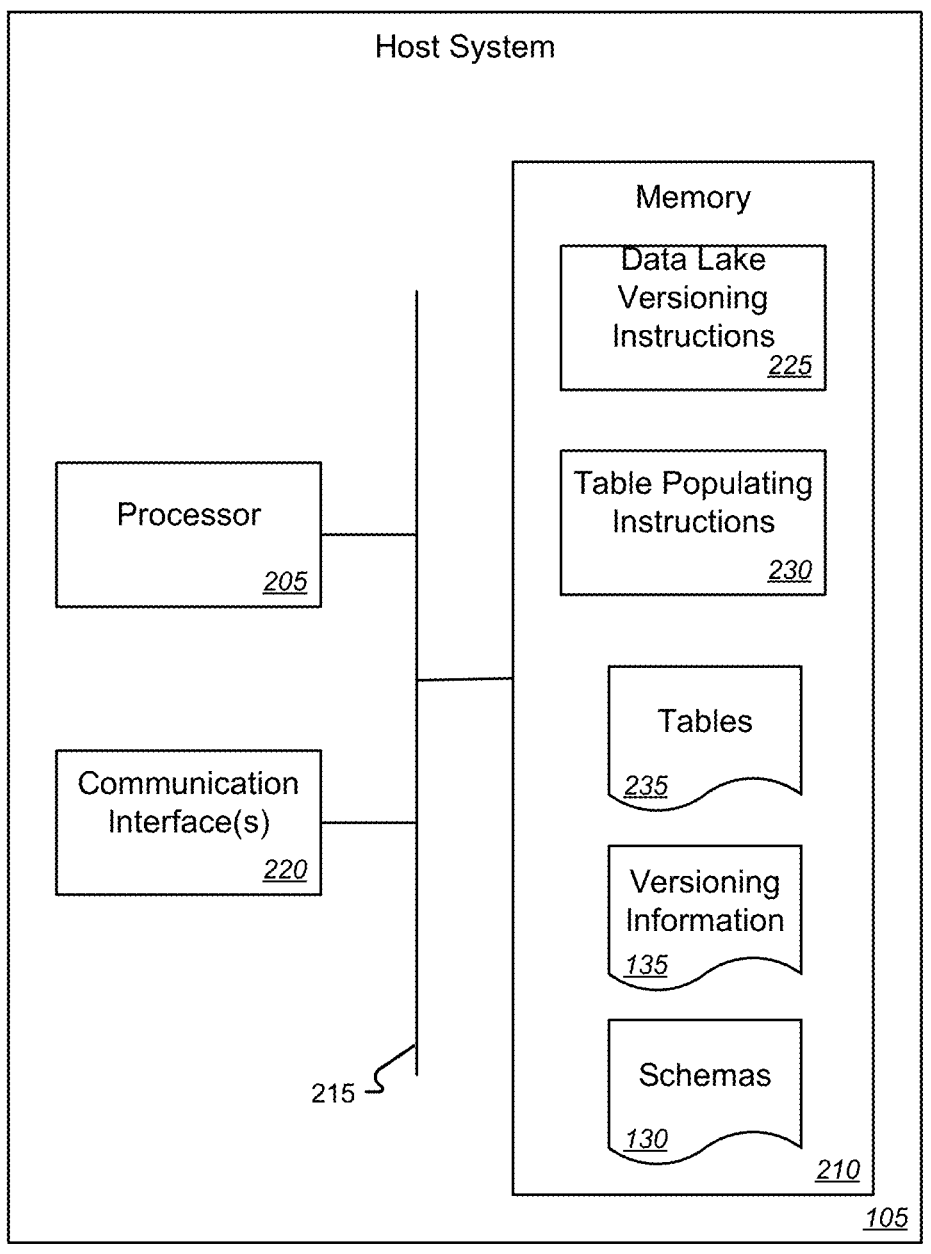
FIG. 2 is a block diagram illustrating additional details of components of a host system for providing a self-versioning data lake according to one embodiment of the present disclosure.

FIG. 2 is a block diagram illustrating additional details of components of a host system for providing a self-versioning data lake according to one embodiment of the present disclosure. As illustrated in this example, the host system 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the host system 105 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communications interfaces 320. The communication interfaces 220 can comprise, for example, Ethernet, Bluetooth, WiFi, or other type of wired or wireless communications interfaces. The memory 210 can store therein a set of data lake versioning instructions 225 which, when executed by the processor 205, causes the processor 205 to maintain a corpus of data in an initial version 125A a data lake 125, monitor versioning information 135 for each of a plurality of schemas 130 for data submitted to the data lake 125, detect a change in a schema of the plurality of schemas 130 based on the monitoring of the versioning information 135 for the plurality of schema 130, and create a new version 125B of the data lake 125 based on the detected changes in the schema while maintaining the initial version 125A of the data lake 125.

Creating the new version 125B of the data lake 125 can comprise retrieving the schema 130 for which the change was detected, creating a set of tables 235 representing a new version of the retrieved schema, and populating the new version of the data lake 125B with data based on the created set of tables 235. As will be described further below, creating the new version 125B of the data lake 125 can comprise generating a set of table populating instructions 230 and populating the tables 235 defining the schema 130 can comprise executing the table population instructions 230.

The data lake versioning instructions 225 can further cause the processor 205 to provide a notification of availability of the new version 125B of the data lake 125 to users of the data lake 125, i.e., one or more client systems 120A-120C. Providing a notification of availability of the new version 125B of the data lake 125 to users of the data lake can comprise providing an indication of the detected change in the schema and a period of time for which the initial version of the data lake will remain available. The data lake versioning instructions 225 can further cause the processor 205 to expire the initial version 12A of the data lake 125 after the period of time has passed.

Figure 3:
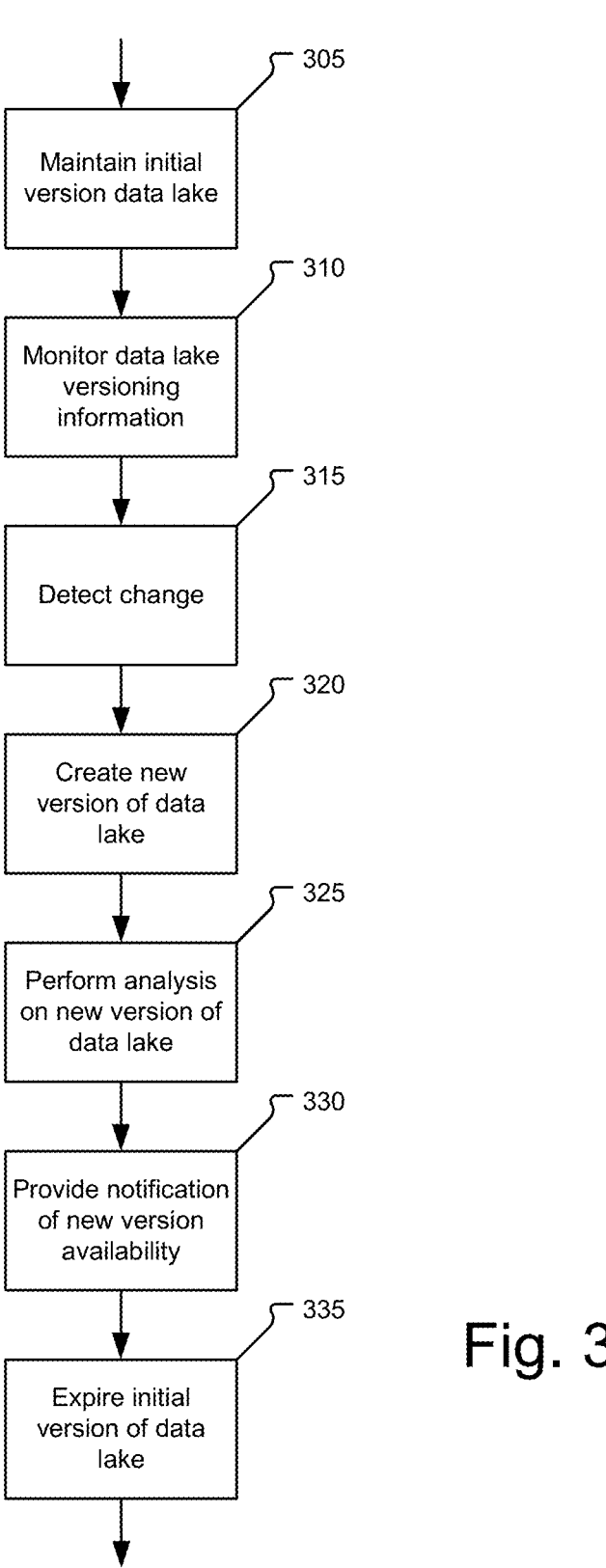
FIG. 3 is a flowchart illustrating an exemplary process of providing a self-versioning data lake according to one embodiment of the present disclosure.

FIG. 3 is a flowchart illustrating an exemplary process of providing a self-versioning data lake according to one embodiment of the present disclosure. As illustrated in this example, providing access to a self-versioning data lake can comprise maintaining 305 a corpus of data in an initial version the data lake, monitoring 310 versioning information for each of a plurality of schemas for data submitted to the data lake, and detecting 315 a change in a schema of the plurality of schemas based on the monitoring of the versioning information for the plurality of schema. Generally speaking, detecting 315 a change in a schema can comprise determining whether a schema version of a table has changed based on the monitored versioning information and, if so, reading information about the current schema version.

Once a change in a schema version has been detected 315, a new version of the data lake can be created 320 based on the detected 315 changes in the schema while maintaining the initial version of the data lake. That is, a new version of the data lake using the changed schema can be created. Additional details of an exemplary process for creating 320 a new version of the data lake will be described below with reference to FIG. 4.

In some cases, once the new version of the data lake is created 320, an analysis can be performed 325 on the new version of the data lake. For example, this analysis can comprise determining, based on known uses of the data in the data lake by one or more clients, whether those uses will be affected by the changes made to the schemas. In some cases, such as adding a column to an end of a table, queries on that table made by client processes may not be impacted. In such cases, there may be no need for changes to the client processes.

A notification of availability of the new version of the data lake can be provided 330 to users of the data lake, e.g., in the form of an email, instant message, text message, etc. Providing 330 a notification of availability of the new version of the data lake to users of the data lake can comprise providing an indication of the detected change in the schema and a period of time for which the initial version of the data lake will remain available. Additionally, or alternatively, the notification can include an indication of results of performing 325 an analysis on the new version of the data lake, e.g., indicating queries that need to be updated based on the schema changes. The initial version of the data lake can then be expired 335 after the period of time has passed.

Figure 4:
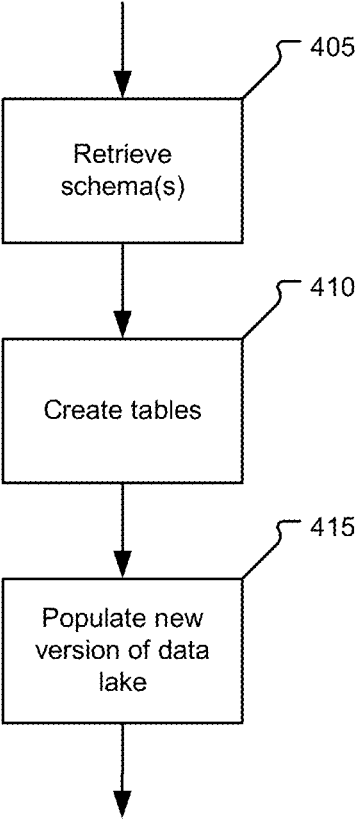
FIG. 4 is a flowchart illustrating additional details of an exemplary process for creating a new version of a data lake according to one embodiment of the present disclosure.

FIG. 4 is a flowchart illustrating additional details of an exemplary process for creating a new version of a data lake according to one embodiment of the present disclosure. As illustrated in this example, creating the new version of the data lake can comprise retrieving 405 the schema for which the change was detected. Additional details of an exemplary process for retrieving 405 the schema for which the change was detected will be described below with reference to FIG. 5. A set of tables representing a new version of the retrieved schema can be created 410. Additional details of an exemplary process for creating 410 a set of tables representing a new version of the retrieved schema will be described below with reference to FIG. 6. The new version of the data lake can then be populated 415 with data based on the created set of tables. Additional details of an exemplary process for populating 415 the new version of the data lake will be described below with reference to FIG. 7.

Figure 5:
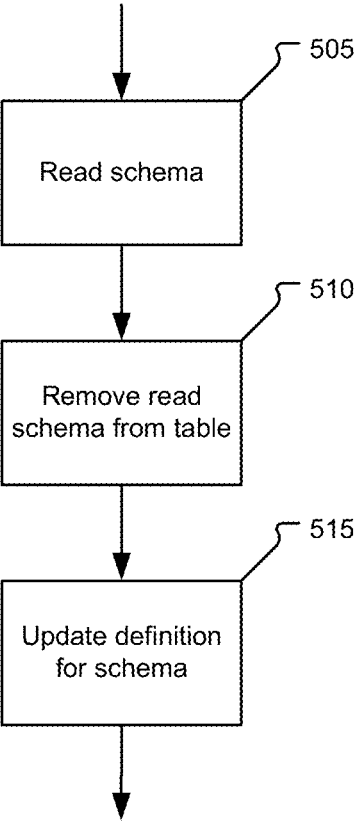
FIG. 5 is a flowchart illustrating additional details of an exemplary process for retrieving a schema for which a change has been detected according to one embodiment of the present disclosure.

FIG. 5 is a flowchart illustrating additional details of an exemplary process for retrieving a schema for which a change has been detected according to one embodiment of the present disclosure. As illustrated in this example, retrieving the schema for which the change was detected can comprise reading 505 the changed schema, e.g., by fetching schema tables and extracting table name and columns. For each column, information can be read including, but not limited to, a variable type, a maximum length (if applicable to the variable type), any constraints such as a foreign key or primary key, checking if a variable can be null, etc.

Tables and columns defined to be excluded can be removed 510 from the read 505 schema. For example, removing 510 excluded tables can comprise bypassing schema tables indicated in configuration information. Similarly, removing 510 excluded columns can comprise bypassing columns of the table indicated in the configuration information for the specific table.

A definition for the schema can then be updated 515 based on the removed tables and columns. Updating 515 the definition for the schema can comprise saving the previously extracted data.

Figure 6:
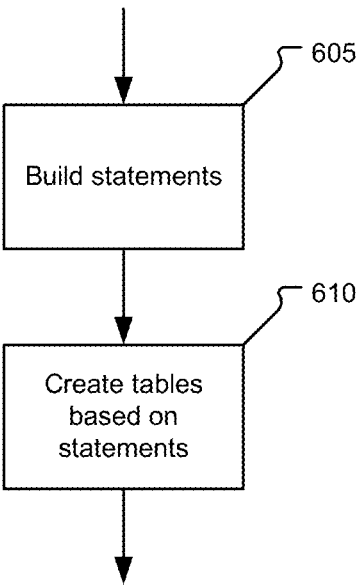
FIG. 6 is a flowchart illustrating additional details of an exemplary process for creating a set of tables representing a new version of a schema according to one embodiment of the present disclosure.

FIG. 6 is a flowchart illustrating additional details of an exemplary process for creating a set of tables representing a new version of a schema according to one embodiment of the present disclosure. As illustrated in this example, creating the set of tables representing the new version of the retrieved schema can comprise building 605 a set of statements defining the set of tables representing the new version of the retrieved schema. Generally speaking, this can comprise creating commands for creating external tables based on the obtained information for the current schema. The commands can contain the path to the data to which the created external table will apply. The set of tables representing the new version of the schema can be created 610 based on the set of statements, i.e., by executing the created commands.

Figure 7:
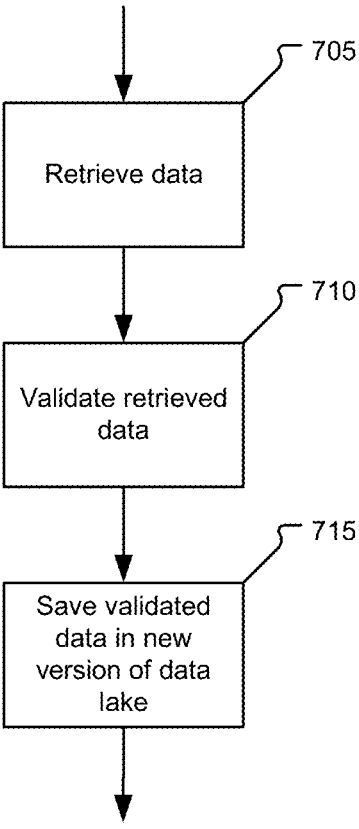
FIG. 7 is a flowchart illustrating additional details of an exemplary process for populating a new version of a data lake with data according to one embodiment of the present disclosure.

FIG. 7 is a flowchart illustrating additional details of an exemplary process for populating a new version of a data lake with data according to one embodiment of the present disclosure. As illustrated in this example, populating the new version of the data lake with data based on the created set of tables can comprise retrieving 705 data to be saved in the new version of the data lake based on the set of tables. For example, the data can be retrieved from the source or elsewhere, e.g., saved in a database, etc. The retrieved data can then be validated 710. For example, the data can be validated 710 for datatype, length, e.g., based depending on data type, constraints such as primary key and foreign key, whether Null values are in columns that allow them, etc. The validated 710 data can then be saved 715 in the new version of the data lake.

Figure 8:
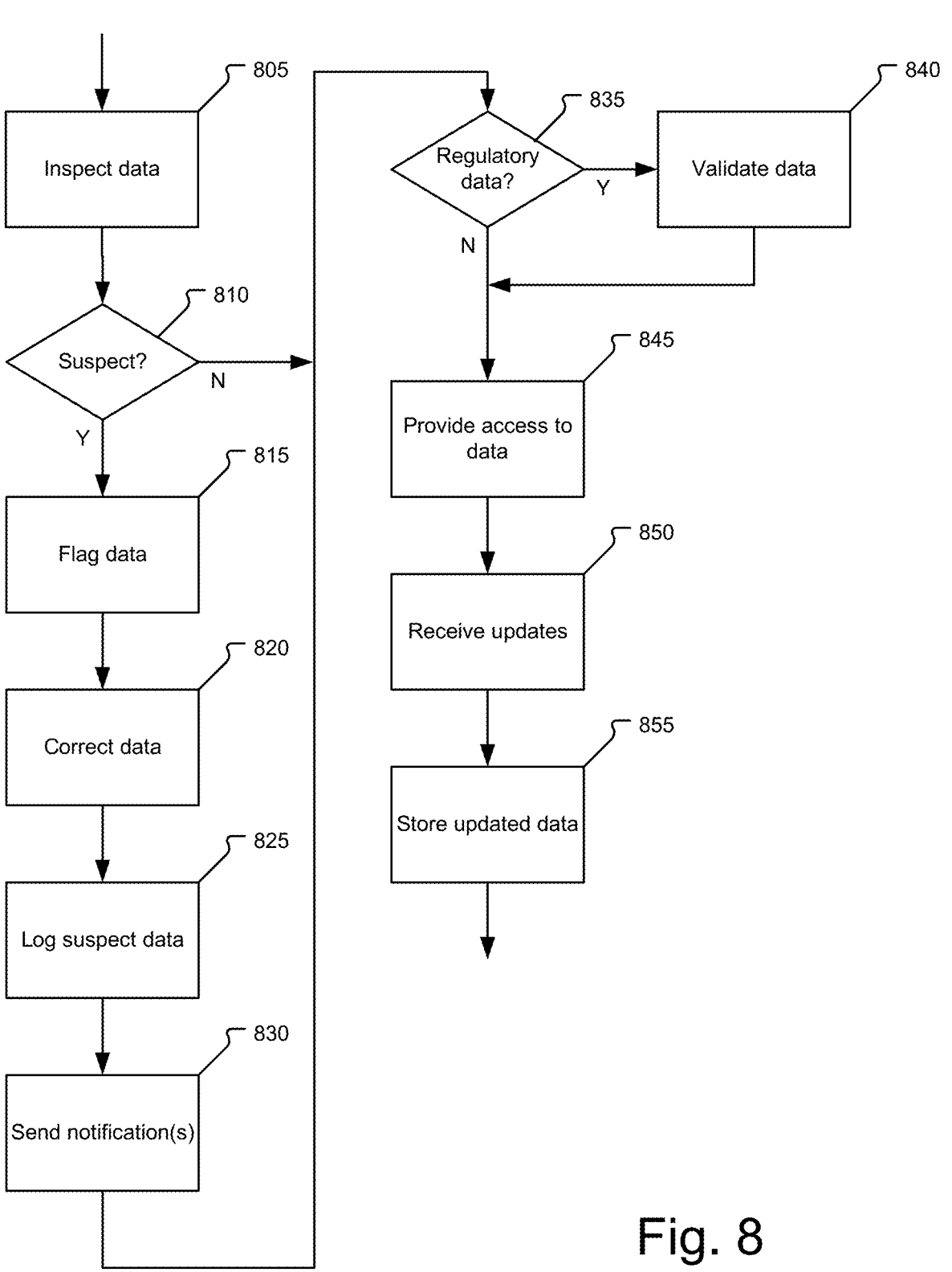
FIG. 8 is a flowchart illustrating an exemplary process for performing data quality enforcement according to one embodiment of the present disclosure.

FIG. 8 is a flowchart illustrating an exemplary process for performing data quality enforcement according to one embodiment of the present disclosure. According to one embodiment, the host system can be adapted to perform data quality checks and enforcement on the data in the data lake 125. This can be performed in a number of different ways and ant various times including, but not limited to, when a new version of the data lake is created, when data to be stored in the data lake is received, at scheduled times or intervals, upon demand, on the occurrence of a predefined event, etc.

As illustrated in FIG. 8, data quality enforcement can comprise inspecting 805 the data and making a determination 810 as to whether the data is suspect. Determining 810 whether the data is suspect can be performed by applying to the data one or more rules defined for a client using the data during development. Data that is not overtly incorrect but appears abnormal can also be considered suspect.

Data determined 810 to be suspect 810 can be flagged 815 and, in some cases, may be corrected 820. For example, a set of rules can be defined for the data, based on the client use of that data, during development and can be applied to the suspect data to correct the data specifically for the client. The suspect data, whether corrected 820 or flagged 815, can be logged 825 and one or more notifications can be sent 830 to various entities. For example, one or more notifications can be sent to operators via e-mail when automated operations fail or are flagged as suspect. Administrators can predefine the e-mail addresses and opt-in to specific alerts by configuration.

A determination 835 can be made as to whether the data comprises regulatory data. Regulatory data is data that is used to verify the integrity of various systems and ensure that they adhere to regulatory requirements. It can be insulated from common (and expected) data errors that occur during the normal operation of the system. Data that is determined 835 to be regulatory may not be made immediately available as soon as it is loaded. Instead, it can pass a validation 840 process, as defined and agreed to by the client using the data, on a client-by-client basis.

Regulatory data can be staged and made available to users designated with the role of validating regulatory data. The user can inspect and approve the regulatory data and/or make adjustments when necessary. When regulatory data is available for review, the host system can create a task that informs the users that data is ready for inspection. The task can be cleared when the data has been approved and made available. Additionally, or alternatively, regulatory data can be validated automatically by comparing data with other systems that are known to be correct.

Access can be provided 845 to flagged data, e.g., through a graphical user interface, and updates to the data can be received 850. For example, data on some days can be abnormal due to external events, such as inclement weather, sporting events, etc. These events are useful in analyzing data, especially historical data where the reasons are not easily recalled by analysts. Such data can be provided, e.g., through a graphical user interface, to allow the client to add, edit, and remove such events. Deletions and adjustments can be recorded so that they can be rolled back. It is also possible to defer data package processing until suspect data is inspected, in which case approval of the data can be received through the graphical user interface. Updated and/or approved data can then be stored 855.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for providing a self-versioning data lake, the method comprising:
   maintaining, by a host system, a corpus of data in the self-versioning data lake;
   performing, by the host system, data quality enforcement on the corpus of data in the self-versioning data lake; and
   providing, by the host system, a notification of availability of a new version of the self-versioning data lake to users of the data lake.

2. The method of claim 1, wherein maintaining the corpus of data in the self-versioning data lake comprises:
   maintaining the corpus of data in an initial version of the self-versioning data lake;
   monitoring versioning information for each of a plurality of schemas for data submitted to the self-versioning data lake;
   detecting a change in a schema of the plurality of schemas based on the monitoring of the versioning information for the plurality of schema; and
   creating the new version of the self-versioning data lake based on the detected changes in the schema while maintaining the initial version of the data lake.

3. The method of claim 1, wherein performing data quality enforcement on the corpus of data in the self-versioning data lake comprises:
   inspecting data within the corpus of data; and
   determining, based on a set of predefined rules for the data, whether the inspected data is suspect.

4. The method of claim 3, further comprising, in response to determining the inspected data is suspect:
   flagging the suspect data;
   correcting the suspect data;
   logging the suspect data; and
   providing a notification of the suspect data.

5. The method of claim 4, further comprising:
   determining whether the inspected data comprises regulatory data related to regulatory requirements; and in response to determining the inspected data comprises regulatory data, validating the regulatory data based on a validation process defined by a client using the regulatory data.

6. The method of claim 5, further comprising:

providing access to the flagged, suspect data;

receiving an update to the flagged, suspect data; and storing the received update to the flagged, suspect data in the corpus of data.

7. The method of claim 1, wherein data quality enforcement is performed on the corpus of data in the self-versioning data lake when the new version of the data lake is created.

8. The method of claim 1, wherein data quality enforcement is performed on the corpus of data in the self-versioning data lake when data to be stored in the data lake is received.

9. The method of claim 1, wherein data quality enforcement is performed on the corpus of data in the self-versioning data lake at scheduled times.

10. The method of claim 1, wherein data quality enforcement is performed on the corpus of data in the self-versioning data lake upon demand.

11. The method of claim 1, wherein data quality enforcement is performed on the corpus of data in the self-versioning data lake on the occurrence of a predefined event.

12. A system comprising:

a processor; and a memory coupled with and readable by the processor and storing therein a set of instructions which, when executed by the processor, causes the processor to:

maintain a corpus of data in a self-versioning data lake;

perform data quality enforcement on the corpus of data in the self-versioning data lake; and provide a notification of availability of a new version of the self-versioning data lake to users of the data lake.

13. The system of claim 12, wherein maintaining the corpus of data in the self-versioning data lake comprises:

maintaining the corpus of data in an initial version of the self-versioning data lake;

monitoring versioning information for each of a plurality of schemas for data submitted to the self-versioning data lake;

detecting a change in a schema of the plurality of schemas based on the monitoring of the versioning information for the plurality of schema; and creating the new version of the self-versioning data lake based on the detected changes in the schema while maintaining the initial version of the data lake.

14. The system of claim 13, wherein performing data quality enforcement on the corpus of data in the self-versioning data lake comprises:

inspecting data within the corpus of data; and determining, based on a set of predefined rules for the data, whether the inspected data is suspect.

15. The system of claim 14, wherein the instructions further cause the processor to, in response to determining the inspected data is suspect:

flag the suspect data;

correct the suspect data;

log the suspect data; and provide a notification of the suspect data.

16. The system of claim 15, wherein the instructions further cause the processor to:

determine whether the inspected data comprises regulatory data related to regulatory requirements; and in response to determining the inspected data comprises regulatory data, validate the regulatory data based on a validation process defined by a client using the regulatory data.

17. The system of claim 16, wherein the instructions further cause the processor to:

provide access to the flagged, suspect data;

receive an update to the flagged, suspect data; and store the received update to the flagged, suspect data in the corpus of data.

18. The system of claim 12, wherein data quality enforcement is performed on the corpus of data in the self-versioning data lake when the new version of the data lake is created.

19. The system of claim 12, wherein data quality enforcement is performed on the corpus of data in the self-versioning data lake when data to be stored in the data lake is received.

20. A non-transitory, computer-readable medium comprising a set of instructions stored therein which, when executed by a processor, causes the processor to:

maintain a corpus of data in a self-versioning data lake;

perform data quality enforcement on the corpus of data in the self-versioning data lake; and provide a notification of availability of a new version of the self-versioning data lake to users of the data lake.

* * * * *